United States Patent
Sim et al.

(10) Patent No.: US 9,762,384 B2
(45) Date of Patent: Sep. 12, 2017

(54) GENERATION AND VERIFICATION OF ALTERNATE DATA HAVING SPECIFIC FORMAT

(71) Applicant: PENTA SECURITY SYSTEMS INC., Seoul (KR)

(72) Inventors: SangGyoo Sim, Seoul (KR); Duk Soo Kim, Seoul (KR); Kyung Moon Nam, Seoul (KR); Taejoon Jung, Seoul (KR); Seok Woo Lee, Seoul (KR)

(73) Assignee: PENTA SECURITY SYSTEMS INC., Seoul (KR)

( * ) Notice: Subject to any disclaimer, the term of this patent is extended or adjusted under 35 U.S.C. 154(b) by 0 days.

(21) Appl. No.: 14/409,720

(22) PCT Filed: Jul. 1, 2013

(86) PCT No.: PCT/KR2013/005786
§ 371 (c)(1),
(2) Date: Dec. 19, 2014

(87) PCT Pub. No.: WO2014/003497
PCT Pub. Date: Jan. 3, 2014

(65) Prior Publication Data
US 2015/0326388 A1 Nov. 12, 2015

(30) Foreign Application Priority Data
Jun. 29, 2012 (KR) .................. 10-2012-0071353

(51) Int. Cl.
*G06F 21/60* (2013.01)
*H04L 9/06* (2006.01)
(Continued)

(52) U.S. Cl.
CPC ............ *H04L 9/0618* (2013.01); *G06F 21/60* (2013.01); *H04L 9/0816* (2013.01); *H04L 9/3239* (2013.01); *H04L 2209/34* (2013.01)

(58) Field of Classification Search
CPC ... H04L 9/0618; H04L 9/0816; H04L 9/3239; H04L 2209/34; G06F 21/60
See application file for complete search history.

(56) References Cited

U.S. PATENT DOCUMENTS 5,623,549 A * 4/1997 Ritter .................... H04L 9/0625
380/37
6,345,101 B1 * 2/2002 Shukla .................. H04L 9/0625
380/200
(Continued)

FOREIGN PATENT DOCUMENTS

KR 1020080052092 A 6/2008
KR 1020080071697 A 8/2008
(Continued)

*Primary Examiner* — Sharon Lynch
(74) *Attorney, Agent, or Firm* — Ladas & Parry LLP (57) ABSTRACT

The method for encoding a character string by a data processing device disclosed in the present specification comprises the steps of: acquiring input data; performing a one-way function to generate ciphertext based on the input data; and converting the ciphertext to output data. In the conversion step, the output characters constituting the output data are selected from the group of input characters constituting the input data, and the length of the output data becomes a specific length.

7 Claims, 7 Drawing Sheets

(51) Int. Cl.
*H04L 9/08* (2006.01)
*H04L 9/32* (2006.01)

(56) References Cited

U.S. PATENT DOCUMENTS

| | | | | |
|---|---|---|---|---|
| 6,885,748 B1* | 4/2005 | Wang | G06F 21/10 | 380/201 |
| 6,963,976 B1* | 11/2005 | Jutla | H04L 9/0637 | 707/999.009 |
| 7,321,659 B2* | 1/2008 | Hall | H04L 9/0643 | 380/28 |
| 7,418,098 B1* | 8/2008 | Mattsson | H04L 9/0637 | 380/28 |
| 7,864,952 B2* | 1/2011 | Pauker | H04L 9/0625 | 380/28 |
| 8,437,470 B2* | 5/2013 | Mantin | H04L 9/28 | 380/28 |
| 8,600,048 B1* | 12/2013 | Hansen | G06F 21/62 | 380/28 |
| 8,855,296 B2* | 10/2014 | Pauker | G06F 21/6218 | 380/277 |
| 9,208,491 B2* | 12/2015 | Spies | G06F 21/6209 | |
| 2004/0252836 A1* | 12/2004 | Yoshida | H04L 9/0643 | 380/268 |
| 2007/0038579 A1* | 2/2007 | Ansley | G06Q 20/382 | 705/64 |
| 2007/0140478 A1* | 6/2007 | Komano | H04L 9/003 | 380/28 |
| 2007/0286418 A1* | 12/2007 | Hall | H04L 9/0643 | 380/37 |
| 2008/0170693 A1* | 7/2008 | Spies | G06F 21/6209 | 380/277 |
| 2008/0187132 A1* | 8/2008 | Sung | H04L 9/0637 | 380/28 |
| 2009/0310778 A1* | 12/2009 | Mueller | G06Q 20/3823 | 380/44 |
| 2010/0061548 A1* | 3/2010 | Shirai | H04L 9/002 | 380/28 |
| 2010/0074441 A1* | 3/2010 | Pauker | H04L 9/0625 | 380/45 |
| 2010/0111297 A1* | 5/2010 | Pauker | H04L 9/0687 | 380/37 |
| 2010/0284532 A1* | 11/2010 | Burnett | G06F 21/6209 | 380/28 |
| 2011/0096923 A1* | 4/2011 | Rollgen | H04L 9/0625 | 380/28 |
| 2011/0103579 A1* | 5/2011 | Martin | G06F 21/602 | 380/28 |
| 2011/0211689 A1* | 9/2011 | von Mueller | G06Q 20/085 | 380/28 |
| 2011/0280394 A1* | 11/2011 | Hoover | H04L 9/0618 | 380/28 |
| 2012/0063597 A1 | 3/2012 | Tropp et al. | | |
| 2012/0128153 A1* | 5/2012 | Golic | H04L 63/0435 | 380/45 |
| 2013/0168450 A1* | 7/2013 | von Mueller | H04L 9/28 | 235/449 |
| 2013/0339252 A1* | 12/2013 | Pauker | H04L 9/06 | 705/71 |
| 2014/0089204 A1* | 3/2014 | Spies | G06F 21/6209 | 705/71 |
| 2014/0108813 A1* | 4/2014 | Pauker | G06F 21/6218 | 713/189 |
| 2014/0344580 A1* | 11/2014 | Von Mueller | G06Q 20/12 | 713/172 |
| 2015/0134972 A1* | 5/2015 | Martin | G06F 21/602 | 713/189 |
| 2015/0326388 A1* | 11/2015 | Sim | G06F 21/60 | 380/28 |

FOREIGN PATENT DOCUMENTS

| | | |
|---|---|---|
| KR | 1020100062803 A | 6/2010 |
| KR | 1020110087094 A | 8/2011 |
| KR | 101193599 B1 | 10/2012 |

* cited by examiner

GENERATION AND VERIFICATION OF ALTERNATE DATA HAVING SPECIFIC FORMAT

BACKGROUND

1. Field of the Invention

The present invention relates to generation and verification of alternative data having a specific format.

2. Discussion of Related Art

An encrypting system for information security not only ensures confidentiality of data, but also provides a service such as data integrity or authentication. Although a two-way encryption scheme is used for the confidentiality of the data, a one-way encryption scheme may be used for a service such as integrity or authentication.

These encryption schemes may change the format of digital data. For example, when plaintext constituted of a numeric type of character string is encrypted using a block encryption algorithm such as an advanced encryption standard (AES), ciphertext may include a character string rather than a numeric form. The change of this data format is the same even in the one-way encryption technique.

Recently, rules or industry requirements that force the protection of personal information have increased. The personal information may be stored or managed by a database (DB) and transmitted through a communication network. Here, the personal information is handled as data represented in a specific format. In particular, a method of protecting personal information by storing or transmitting alternative information corresponding to the personal information without directly handling the personal information serving as a protection target is provided. In this case, when data is processed by merely applying a one-way or two-way encryption scheme for protection of the personal information, there is a problem in that an existing DB or a communication network does not reflect a change in the format of processed data.

For this, format-preserving encryption and decryption are disclosed in U.S. Pat. No. 7,864,952. Although the format-preserving encryption scheme to be applied in two ways is disclosed in the aforementioned U.S. Pat. No. 7,864,952, a format change problem of the one-way function is not mentioned.

In addition, U.S. Patent Application Publication No. 2009/310778 discloses a token system for protecting personal information using alternative information. The aforementioned U.S. Patent Application Publication No. 2009/310778 only discloses a method of protecting the personal information using the alternative information without mentioning a format change problem of the alternative information.

Accordingly, there is a need for a method of generating and verifying alternative data corresponding to information serving as a protection target without requiring a design change of an existing data processing system.

SUMMARY OF THE INVENTION

The present invention provides a method and device for generating alternative data having a specific format.

In addition, the present invention provides a method and device for preserving characteristics of a format in which input data is represented and generating alternative data available instead of the input data.

In addition, the present invention provides a method and device for verifying already generated alternative data.

In addition, the present invention provides a method and device that enable alternative information to be used for various lengths of data by iteratively applying a one-way function or a random number generator in generating the alternative information.

As one exemplary embodiment, there is provided a method of encrypting a character string in a data processing device. The method includes acquiring input data; generating cipher data (CD) based on the input data by executing a one-way function; and converting the CD into output data, wherein the converting includes: selecting the output characters constituting the output data from a set of input characters constituting the input data, and converting the CD so that a length of the output data becomes a specific length.

The exemplary embodiment or other exemplary embodiments may include any one of the following characteristics.

The converting may include: dividing the CD into one or more blocks; determining the output characters corresponding to the blocks; and generating the output data by combining the output characters, and the number of one or more blocks may be determined based on the length of the output data.

In addition, the determining of the output characters may include: calculating indices corresponding to the one or more blocks; and selecting the output characters from the set to which the input characters belong according to the indices.

The generating of the CD may include: generating the CD by executing a one-way function for the input data at least one or more times, and the one-way function may be iteratively executed so that a length of the CD is sufficiently divided into the blocks. In addition, the one-way function may be executed using all or part of the input data and an arbitrary seed as inputs.

As another exemplary embodiment, there is provided a method of verifying a character string in a data processing device. The character string verification method include acquiring input data; acquiring alternative information corresponding to the input data; generating a CD based on the input data by executing a one-way function; converting the CD into output data; and determining whether the output data is the same as the alternative information, wherein the converting includes: selecting the output characters constituting the output data from a set of input characters constituting the input data, and converting the CD so that a length of the output data becomes a specific length.

As still another exemplary embodiment, there is provided a method of generating a random number in a data processing device. The random number generation method includes generating random numbers using a random number generator at least one time; generating CD by combining the random numbers; and converting the CD into output data having specific format characteristics, wherein the converting includes: selecting the output characters constituting the output data from a specific set of input characters constituting the input data, and converting the CD so that a length of the output data becomes a specific length.

The converting may include: dividing the CD into one or more blocks; determining the output characters corresponding to the blocks; and generating the output data by combining the output characters, and the number of one or more blocks may be determined based on a length of the output data. In addition, the determining of the output characters may include: calculating indices corresponding to the one or more blocks; and selecting the output characters from the specific set according to the indices. In addition, the generating of the CD may include: generating the CD by executing the random number generator at least one time and combining the random numbers; and the random number generator may be iteratively executed so that a length of the CD is sufficiently divided into the blocks.

As still another exemplary embodiment, there is provided a data processing device. The data processing device includes: an input unit configured to acquire input data; an encrypting unit configured to execute a one-way function and generate CD based on the input data, and a converting unit configured to convert the CD into output data, wherein the converting unit selects the output characters constituting the output data from a set of input characters constituting the input data, and converts the CD so that a length of the output data becomes a specific length.

It is possible to use alternative data instead of data of a plaintext type through one-way encryption disclosed in the present specification.

In addition, the system can use alternative data corresponding to sensitive personal information without using the sensitive personal information through an alternative data generation method disclosed in the present specification.

In addition, it is possible to verify the validity of alternative information in use in an alternative data verification method disclosed in the present specification.

In addition, the data processing device can process the alternative data without separate correction for processing encrypted data by adopting an alternative data generation and verification method disclosed in the present specification.

BRIEF DESCRIPTION OF THE DRAWINGS

The above and other objects, features and advantages of the present specification will become more apparent to those of ordinary skill in the art by describing in detail exemplary embodiments thereof with reference to the accompanying drawings, in which.

DETAILED DESCRIPTION OF EXEMPLARY EMBODIMENTS

Technology disclosed in the present specification is applied to a data processing system for information security. However, the technology disclosed in the present specification is not limited thereto and is applicable to any data processing system and method, any communication system and method, any database and database management method, any information security system and method, and the like to which the technical sprit is applicable.

The technical terms used in the present specification are merely used to describe specific embodiments of the present specification. Therefore, it should be understood that the terms used herein are not intended to limit the present specification. Additionally, unless defined otherwise, the technical terms used in the present specification should be interpreted by the meaning and significance generally known to and understood by anyone skilled in the art and, therefore, should not be interpreted as an excessively broad and inclusive meaning nor interpreted as an excessively narrow meaning.

Additionally, it is to be understood that, unless obviously and clearly noted or specified otherwise within the specification, singular forms of the terms used herein may include plural forms of the corresponding terms. In the application of the present specification, the term "include(s) (or comprise(s))" should not be interpreted or understood as including, without exception, all of the plurality of elements (or components) or the plurality of steps disclosed in the description of the present specification. In other words, it should be understood that some (or part) of the elements (or components) or some (or part) of the steps may not be included, or that additional elements (or components) or steps may be further included in the present specification.

Furthermore, terms including numeric expressions, such as first, second, and so on, used in the present specification may be used to describe diverse elements of the present specification. However, the elements of the present specification should not be limited by the terms used in the present specification. In other words, such terms will be used only to differentiate one element from other elements of the present specification.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements.

Hereinafter, preferred embodiments of the present invention will be described in more detail with reference to the accompanying drawings. To facilitate the entire understanding of the invention, the same reference numerals in the drawings denote the same elements, and repetitive description of the same elements is omitted. Also, in describing the present invention, if it is determined that detailed description of a disclosed technology may cause ambiguity in describing the principle of the present invention, the detailed description of the same will also be omitted for simplicity. Furthermore, it will be apparent that the appended drawings are merely provided to facilitate the understanding of the scope and spirit of the present invention, and that the appended drawings are not provided to limit the scope and spirit of the present invention. Therefore, it should be understood that the scope and spirit of the present invention can be extended to all variations, equivalents, and replacements in addition to the appended drawings of the present invention.

Figure 1:
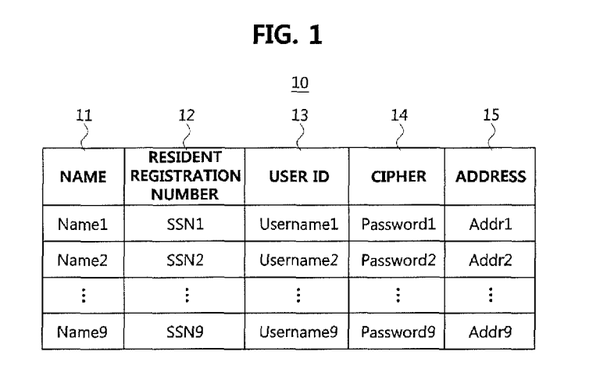
FIG. 1 is a table available in an alternative data generation and verification method disclosed in the present specification.

FIG. 1 illustrates a table available in an alternative data generation and verification method disclosed in the present specification.

The table 10 may be configured to include various fields. For example, the table 10 may include fields such as a name 11, a social security number or resident registration number 12, a user ID or username 13, a cipher 14, and an address 15.

It is necessary to handle values of the fields so that confidentiality is ensured according to management policies or rules. For example, it is possible to use values corresponding to the address field 15 by encrypting the values according to a two-way encryption scheme and storing and decoding the encrypted values without storing the values in the type of plaintext according to the policy or the like for address information handling.

In addition, it is necessary to protect the field values in a one-way encryption scheme so that the field value is not decoded according to a management policy or rule. For example, it is necessary to protect values corresponding to the cipher field 14 so that the values are not decoded in the type of plaintext according to a policy for cipher information handling or the like. In this manner, the inspection of validity for the field to be protected in the one-way encryption scheme may be performed by performing the one-way encryption scheme again and determining whether encryption results are the same.

Accordingly, in this case, a device or system for handling the field values can use alternative data corresponding to the field values without directly storing or transmitting the field values corresponding to the type of plaintext. It is necessary to generate this alternative data suitable for a feature of a system having specific format characteristics. In particular, it is necessary to generate the alternative data as information to be stored or transmitted in place of field values corresponding to the alternative data so that the alternative data has format characteristics of a system for storing or transmitting the field values.

In embodiments of the alternative data generation and verification method disclosed in the present specification, the format characteristics of the alternative data may represent a length of the alternative data and a type of character constituting the alternative data.

The length of the alternative data among the format characteristics may be determined in consideration of a maximum length provided in a system in which the alternative data is stored or transmitted and a logical length of a field value of the type of plaintext corresponding to the alternative data. For example, when an actual length of the value of the resident registration number field 12 is 13, the length of the alternative data of the resident registration number field 12 may be determined in consideration of the maximum length allowed in the system in which the alternative data is stored and the actual length.

In addition, a type of character constituting the alternative data among the format characteristics may be determined according to a feature of the system in which the alternative data is stored or transmitted. The type of character can be represented using a set S of elements constituting a character string or the number of elements (|S|) within the set. Characters constituting the alternative data may include a string of characters selected from a set of specific characters. For example, the alternative data may be constituted of only characteristics capable of being included in the field value of the type of plaintext corresponding to the alternative data. Specifically, because the actual value can include a string of characters selected from a set of characters corresponding to numerals 0 to 9 in the example of the value of the resident registration number field 12, the characters constituting the alternative data for the resident registration number field 12 can be selected from a set of characters corresponding to the numbers 0 to 9.

On the other hand, the embodiment disclosed in the present specification relates to a method of generating and verifying the alternative data according to specific format characteristics. For this, the format characteristics can be determined in consideration of characteristics of a system for storing or transmitting the alternative data or characteristics of data of a type of plaintext corresponding to the alternative data.

For example, when the alternative data is managed by the DB, the length of alternative data or the type of character may be determined in consideration of the data type represented in a table storing the alternative data, that is, the data format such as NUMBER, VARCHAR2, NVARCHAR2, VARCHAR, CHAR, PLS_INTEGER, BINARY_INTEGER, LONG, DATE, TIMESTAMP, RAW, LONG RAW, BLOB, or BFILE represented according to a structured query language (SQL).

However, when the data processing device for generating or verifying the alternative data uses CD to which a function of a simple encryption algorithm or the like is applied instead of a field value of the plaintext as the alternative data, it is necessary to perform a conversion process so that the alternative data conforms to specific format characteristics because a value unsuitable for the specific format characteristics may be generated according to characteristics of the function.

On the other hand, although an example of data stored in the DB is disclosed in the present specification, alternative data generation and verification according to exemplary embodiments disclosed in the present specification are not limited thereto and may also be applied to a data storage device and method or a data transmission device and method.

Hereinafter, an exemplary embodiment in which the alternative data processing device according to the exemplary embodiment disclosed in the present specification generates and verifies alternative data in consideration of format characteristics is disclosed.

The data processing device according to the exemplary embodiment disclosed in the present specification, for example, may perform an encryption algorithm such as a cryptographic function or random number generation for alternative data generation and verification.

In particular, exemplary embodiments disclosed in the present specification relate to technology for generating alternative data instead of data of the type of plaintext or generating alternative data based on a random number. For this, although a one-way encryption scheme or random number generation is disclosed as an example, the present specification is not limited thereto. A two-way encryption scheme may be performed in a type different from that in which the alternative data itself is restored to data of the plaintext type.

For this, the data processing device according to the exemplary embodiments disclosed in the present specification may perform an encryption function. The alternative data described in the present specification refers to data to be used instead of the data of the plaintext type so as to protect data generated in the type of plaintext. The data processing device according to the exemplary embodiments disclosed in the present specification protects data of the plaintext type by performing the encryption function and generates alternative data suitable for format characteristics through the conversion process.

That is, the data processing device according to the exemplary embodiments disclosed in the present specification may generate alternative data of the same format as that of data in the plaintext type to replace its values without changing an environment in which the data of the plaintext type is handled. Accordingly, a function of preserving a data format can be performed in the alternative data generation and verification disclosed in the present specification.

Figure 2:
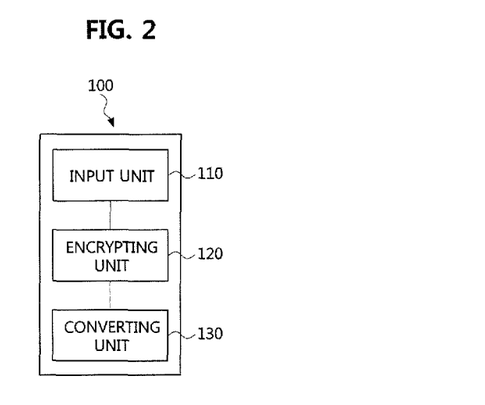
FIG. 2 is an exemplary block diagram of a data processing device in which the alternative data generation and verification method disclosed in the present specification can be adopted.

FIG. 2 is an exemplary block diagram of a data processing device in which the alternative data generation and verification method disclosed in the present specification can be adopted.

The data processing device 100 may include an input unit 110 for acquiring input data, an encrypting unit 120 for generating CD, and a converting unit 130 for converting the CD into output data.

The input unit 110 may acquire other information for operating the encrypting unit 120 or the converting unit 130 in addition to the above-described input data. For example, the input unit 110 may receive system information for the encrypting unit 120, information about output characters constituting output data, and a length of output data or random seed.

In order to protect the input data of the plaintext type, the encrypting unit 120 may generate CD corresponding thereto. In this case, the encrypting unit 120 may perform a one-way function and generate the CD based on the input data. In addition, the encrypting unit 120 may generate CD corresponding to an arbitrary random number. In this case, the encrypting unit 120 may generate the CD based on an operation result of the random number generator.

The converting unit 130 performs a process of converting the CD according to format characteristics. The converting unit 130 generates alternative data available instead of the input data by converting the CD.

The converting unit 130 may select output characters constituting the output data from a set of input characters constituting the input data and convert the CD so that the length of the output data becomes a specific length.

The output data converted by the converting unit 130 may be used as the alternative data for the input data.

Various types of computing devices may be used as the data processing device 100. That is, the data processing device 100 may be implemented in various types such as a personal computer, a server, a workstation, and a main frame.

On the other hand, according to the exemplary embodiments to be described later, an alternative data generation or verification method to be performed by the input unit 110, the encrypting unit 120, or the converting unit 130 may be provided in the form of a program executable in the data processing device 100. The data processing device 100 can be implemented to include a memory for storing the program and a processor for executing the program. The memory may store median values generated in a process of executing the program.

In addition, the data processing device 100 may be implemented in the form of a DB system in which the alternative data generation or verification method to be described later is implemented. In this case, the data processing device 100 may operate in the form of the DB and a single device or a separate device.

In addition, the data processing device 100 may be implemented in the form of a system including an application server. In this case, the application server may be a server for performing some of functions of the encrypting unit 120 or the converting unit 130. For example, the data processing system including the data processing device may be implemented in the form of the application server for separately performing the encryption function and the data processing device 100 for performing the alternative data generation or verification method using the encryption function included in the exemplary embodiments disclosed in the present specification. In this case, the application server connected to a network may be the data processing device for performing a specific function. In addition, the application server may be implemented in the form in which at least one computing device collectively performs a specific function. For example, the application server may be at least one computing device which operates as in cloud computing, virtual computing, or software as a service (SaaS).

Hereinafter, with reference to FIGS. 3 to 6, a method in which the data processing device according to the exemplary embodiment disclosed in the present specification converts CD into output data having a specific format will be specifically described.

Figure 3:
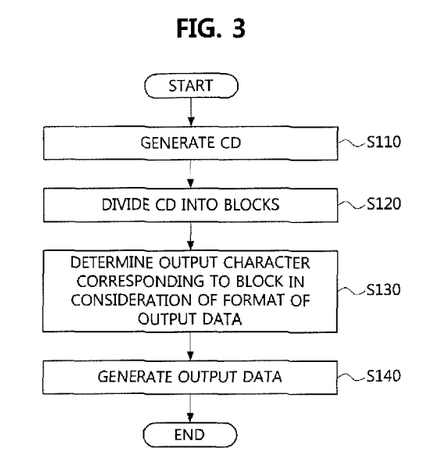
FIG. 3 is an exemplary flowchart of a method of generating alternative data having a specific format in the data processing device.

FIG. 3 is an exemplary flowchart of a method of generating alternative data having a specific format in the data processing device. FIG. 3 illustrates a process of converting the CD generated by the encryption algorithm into alternative data having specific format characteristics. That is, the conversion process is a process of configuring the CD by characters selected from a set of specific characters according to the specific format characteristics and converting the CD into the alternative data corresponding to a character string of a specific length.

Figure 4:
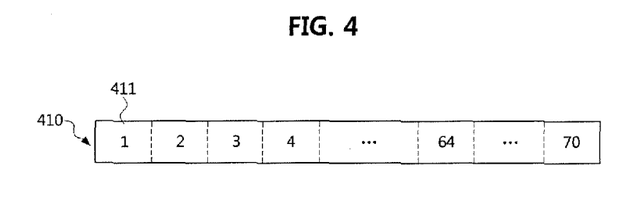
FIG. 4 illustrates an example of the alternative data having the specific format.

FIG. 4 illustrates an example of the alternative data having the specific format. For example, among the format characteristics of the alternative data, the length of the alternative data is assumed to be 64, the characters constituting the alternative data are assumed to be selected from a set S of alphanumeric characters such as large letters (A to Z), small letters (a to z), and numbers (0 to 9). In this case, a maximum length of a field for storing the alternative data is 70 and a magnitude |S| of the set is 62 (26 small letters+26 large letters+10 numbers).

First, the data processing device generates CD (S110). The CD may be data generated by a well-known encryption algorithm or function. When the cipher algorithm or function generates a cipher value (CV) of a fixed length, the CD based on at least one CV can be generated by iteratively executing the encryption algorithm or function in consideration of the length of the alternative data. A specific process of generating the CD will be described alter along with the exemplary embodiment.

In subsequent steps S120, S130, and S140, the data processing device converts the CD into output data and uses the output data as the alternative data. The CD may be converted through the conversion process so that output characters are selected from a set of characters having a specific format and the length of the output data is a specific length.

Specifically, the data processing device divides the CD into one or more blocks B (S120). The one or more blocks are divided in consideration of a magnitude |S| of the set of specific characters. That is, in terms of the magnitude of the blocks B, it is necessary for one block to indicate each of elements of the set S of the specific characters. In addition, as will be described later, the number of division blocks B is the same as a length of the alternative data.

In some exemplary embodiments, the data processing device may initially divide the CD into blocks having a necessary size from the beginning of the data. In this case, the size of the block B may be a smallest integer (the number of bits) that is greater than $\log_2|S|$. Referring to the examples of FIGS. 4 and 5, first, the size of the block (B) 511 into which the CD 510 is divided may be 6 bits representing a smallest integer that is greater than $\log_2|S|=\log_2 62=5.95$. In this case, the CD may be divided into one or more blocks B[1], B[2], . . . , B[64] having a size of $\log_2|S|$ bits.

In addition, in another exemplary embodiment, the data processing device may divide the CD in units of bytes from the beginning of the data. In this case, the data processing device has only bits of a necessary size (521) among bits within the block and the block B may be a bit string having a length of a smallest integer that is greater than $(\log_2|S|)/8$. Referring to the examples of FIGS. 4 and 5, a size of the above-described block (B) 521 may be 1 byte representing a smallest integer which is greater than $(\log_2|S|)/8 = (\log_2 262)/8 = 0.74$ in consideration of the size $|S|$ of the set. In this case, the CD may be divided into one or more blocks B[1], B[2], . . . , B[64] having a size represented by a smallest integer which is greater than $(\log_2|S|)/8$.

In this manner, after a process of dividing the CD into blocks B suitable for the length of the alternative data, a process of determining output characters corresponding to each division block B is performed.

Next, the data processing device determines output characters corresponding to a block in consideration of a format of output data (S130). The data processing device calculates each of the blocks B as an index and determines output characters among characters within the characters within the set S based on the index, so that a specific format is preserved.

The data processing device may calculate each of the blocks B as the index according to various methods. The index is used to cause the block to correspond to a character within the set S, and the index having a value corresponding to the magnitude $|S|$ of the set is required to be calculated. For this, the data processing device can convert each of the blocks B into a natural number and take a result obtained by performing an operation of mod $|S|$ as an index.

For this, the data processing device may perform indexing according to a specific sequence for characters within the set S. That is, referring to FIGS. 4 to 6, the data processing device may pre-store S[1] to S[62] in consideration of the magnitude of the set. It is not necessary to perform the indexing 535 for the characters within the set S every time the conversion process is performed. In the indexing 535 for characters within the set S, a previously obtained result 530 is stored and the stored result may be used.

Figure 5:
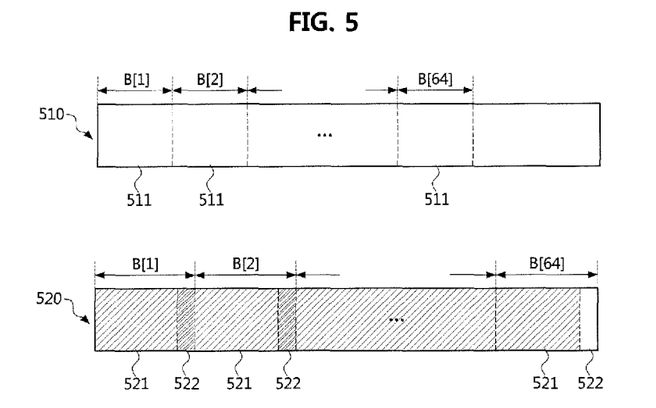
FIG. 5 illustrates an example in which ciphertext is divided according to a block.
Figure 6:
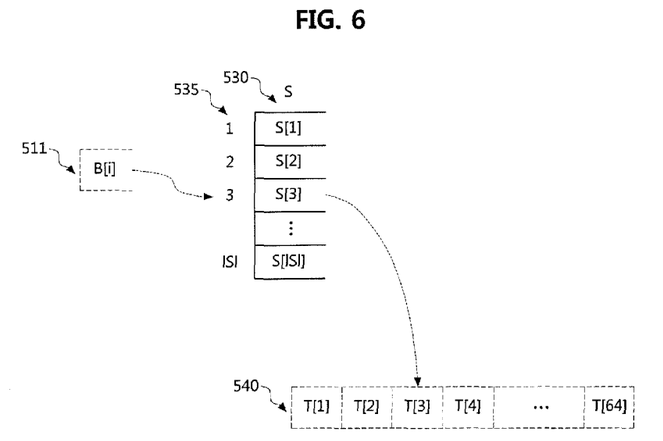
FIG. 6 illustrates an example of a method in which a block corresponds to an output character based on an index.

In the example of FIG. 5, the data processing device may convert the block 511 or 521 into an index. That is, Index [i]=B[i] mod [S] may be calculated with respect to i for 0<i≤Len1. An $i^{th}$ output character T[i] may be determined as T[i]=S[Index[i]]. Here, Len1 denotes a length of alternative data given with specific format characteristics, Index[i] denotes an index of an $i^{th}$ block, and S[i] is an $i^{th}$ character belonging to the set S of output characters, B[i] denotes a value obtained by converting the $i^{th}$ block into a natural number, and T[i] denotes an $i^{th}$ output character within the output data.

Next, the data processing device generates the output data by combining the output characters (S140). The data processing device may generate the output data by concatenating the output characters.

Thereafter, the data processing device may use the output data converted to be suitable for specific format characteristics as the alternative data.

Figure 7:
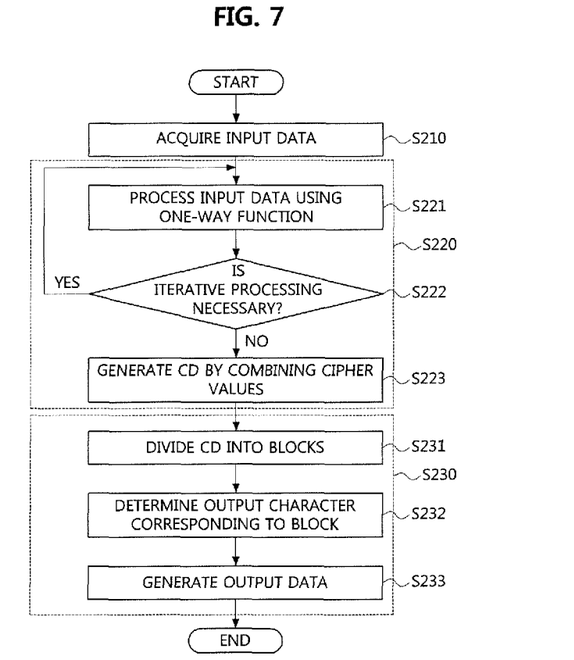
FIG. 7 is an exemplary flowchart illustrating a method in which the data processing device generates alternative data by encrypting a plaintext type of data in one way and performing conversion for format preservation.

FIG. 7 is an exemplary flowchart illustrating a method in which the data processing device generates alternative data by encrypting a plaintext type of data through one-way encryption and performing conversion for format preservation. A method of generating alternative data using one-way encryption illustrated in FIG. 7 may be used when the restoration of primitive data is not necessary. In particular, when the primitive data input to the data processing device is required not to be stored, it is preferable to use the alternative data by the one-way encryption.

Compared to the exemplary embodiment illustrated in FIG. 3, the exemplary embodiment illustrated in FIG. 7 additionally includes a process of acquiring input data before the CD generation step S110. A process of generating the CD based on the input data is disclosed in detail. The conversion steps S120, S130, and S140 described with reference to FIG. 3 are performed for format preservation of the CD. Because these steps are the same as the CD conversion step S230 of FIG. 7 and the like, detailed description thereof is omitted.

First, the data processing device acquires input data (S210). The input data is data of a plaintext format. The input data may be data input according to format characteristics.

Next, the data processing device generates CD based on the input data by executing the one-way function (S220).

The CD may be data generated by the well-known one-way encryption function. For example, the one-way function may be a cryptographic hash function or other one-way functions for generating the CD of a fixed length such as message-digest algorithm 5 (MD5), secure hash algorithm 0 (SHA-0), SHA-1, SHA-256/224, or SHA-512/384.

In order to perform a format preservation function described with reference to FIGS. 3 to 6, it is necessary for the CD to have a sufficient length so that the CD is divided into blocks and each block corresponds to the output character. Accordingly, the data processing device can perform a process S221 of processing the input data using the one-way function at least one time.

When the process S221 of processing the one-way function is iterated, an execution result is different only when an input value is different every time the one-way function is executed. For this, the data processing device may provide a dynamic variable, for example, a value such as a system variable or the number of executions, as an input along with the input data.

Figure 8:
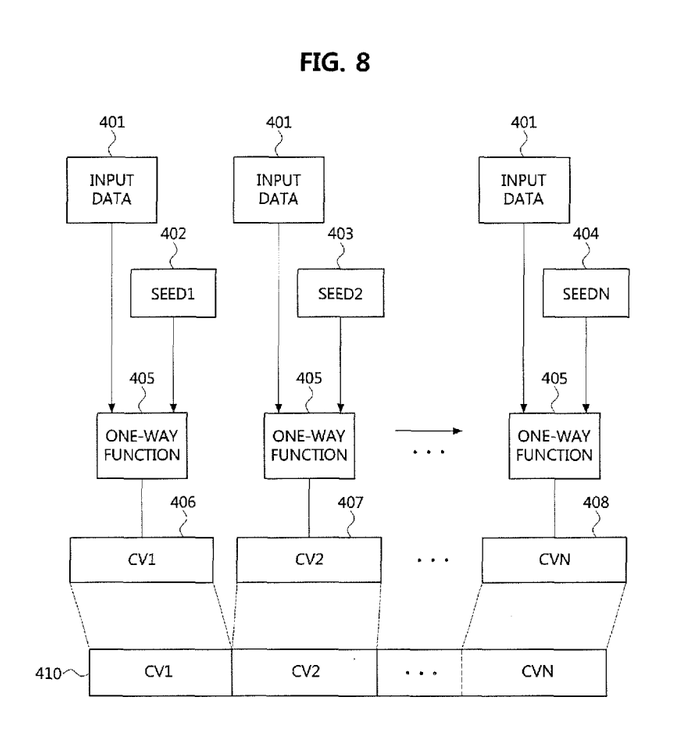
FIG. 8 illustrates an example in which CD is generated by iteratively executing a one-way function.

Referring to FIG. 8, for example, the data processing device provides a different seed input every time each one-way function 405 is performed in addition to a process of providing all or part of the same input data 401 as an input while performing the same one-way function 405.

Next, the data processing device determines whether it is necessary to execute the iterative one-way function (S222). This is a process of determining whether the length of the output data is smaller than the length of the input data when a subsequent conversion step is performed with a CD generated based on CVs which are current execution results of the one-way function.

That is, each processing process S221 of the input data is iteratively performed so that the length of the output data is equal to or greater than the length of the input data even when the subsequent conversion step is performed for the CD. Accordingly, even in the determination process S222, it is necessary to consider format characteristics of the output data.

As described above, the format characteristics may represent a length Len1 of the output data to be used as the alternative data and a type of output character to constitute the output data.

In this case, the data processing device can determine whether an operation has been performed a number of times greater in number than a smallest integer greater than $[(Len1*\log_2|S|)/Len2]$ so as to determine whether the iterative operation is necessary. Here, Len2 represents the number of bits of the CV to be generated as the execution result of the one-way function. In the example of FIG. 4, because Len2 is 160 when the one-way encryption algorithm is SHA-1 of generating a hash value which is a CV having a fixed size of 160 bits, the data processing device determines whether the operation has been performed three times according to $[(Len1*\log_2|S|)/Len2]=[(64*\log_2 62)/160]=2.38$.

Next, the data processing device generates a CD by combining CVs generated as a result of processing (S221) of the one-way function (S223). This is a process of generating the CD by concatenating the CVs generated as processing results when the data processing device iteratively processes the one-way function. Referring to FIG. 8, the data processing device generates the CD 410 to be used in a subsequent conversion process by concatenating CVs 406, 407, and 408 calculated as the execution result of the one-way function.

Next, the data processing device divides the CD into one or more blocks B (S231), determines output characters corresponding to the blocks in consideration of a format of output data (S232), and generates the output data by combining the output characters (S233). Because the processes S231, S232, and S233 are the same as the conversion processes S120, S130, and S140 described with reference to FIG. 3, detailed description thereof is omitted.

The data processing device may use the output data generated as described above as the alternative data. That is, when the input data is required to be stored in the DB, the data processing device may store the output data as the alternative data in the DB field in which the input data input in the plaintext type is stored.

Figure 9:
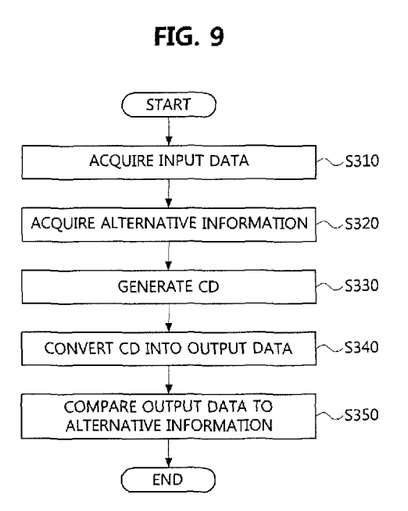
FIG. 9 is an exemplary flowchart illustrating a method in which the data processing device verifies alternative information.

FIG. 9 is an exemplary flowchart illustrating a method in which the data processing device verifies alternative information. The alternative information verification method determines whether the same output data is generated by iterating the alternative information generation method described with reference to FIGS. 7 and 8. Because the alternative information generation method is performed using the one-way function, the data processing device is operated in a scheme of generating output data based on the input data to be verified and comparing the output data to pre-created alternative information. Hereinafter, redundant description of content described with reference to FIGS. 7 and 8 is omitted.

First, the data processing device acquires input data to be verified (S310).

Next, the data processing device acquires alternative information corresponding to the input data (S320). When the alternative information is stored in the DB, the data processing device acquires the alternative information from the DB. The process S320 of acquiring the alternative information may be performed in advance or may be performed before the actual comparison process S350 is performed thereafter.

Next, the data processing device generates CD based on the input data by executing the one-way function (S330), and converts the CD into the output data (S340). Next, the data processing device determines whether the output data is the same as the alternative information (S350).

Figure 10:
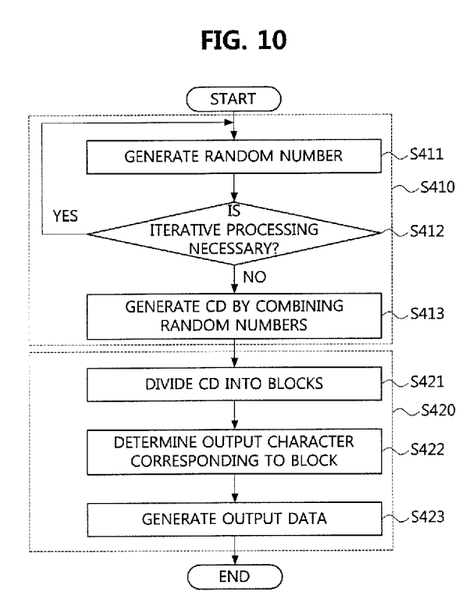
FIG. 10 is an exemplary flowchart of a method in which the data processing device generates alternative data having specific format characteristics through a random number generator.

FIG. 10 is an exemplary flowchart of a method in which the data processing device generates alternative data having specific format characteristics through a random number generator. The example illustrated in FIG. 10 is the same as the example of the alternative data generation method using the one-way ciphering described with reference to FIGS. 7 and 8 except for a difference in the CD generation method. Hereinafter, differences from content described with reference to FIGS. 3 to 7 will be mainly described and redundant description is omitted.

First, the data processing device generates random values (RVs) using a random number generator at least one time (S411). An RV generated by the random number generator has a fixed magnitude.

Next, the data processing device determines whether iterative random number generation of the random number generator is necessary (S412). This is a process of determining whether a length of the output data is satisfied when the data processing device performs a subsequent conversion step based on a combination of currently generated RVs.

This determination is required to be made in consideration of format characteristics of the output data and the format characteristic may include a length Len1 of alternative data. In this case, the data processing device can determine whether an operation has been performed a number of times greater in number than a smallest integer greater than $[(Len1*\log_2|S|)/Len2]$ so as to determine whether the iterative operation is necessary. Here, Len2 represents the number of bits of the CV to be generated by the random number generator.

Next, the data processing device generates a CD by combining the CVs generated by the random number generator (S413). The CD may be generated by concatenating the resulting CVs when the data processing device iteratively executes the random number generator.

Next, the data processing device converts the CD into output data having characteristics of a specific format (S420). Specifically, the data processing device divides the CD into one or more blocks B (S421), determines output characters corresponding to the blocks in consideration of the format of output data (S422), and generates the output data by combining the output characters (S423). Because the processes S421, S422, and S423 are the same as the conversion processes S120, S130, and S140 described with reference to FIG. 3, detailed description thereof is omitted.

The data processing device may use the generated output data as the alternative data. The data processing device may store the output data as the alternative data in a specific field of the DB.

It will be apparent to those skilled in the art that various modifications can be made to the above-described exemplary embodiments of the present specification without departing from the spirit or scope of the invention of the present specification. Thus, it is intended that the technology of the present specification covers all such modifications provided they come within the scope of the appended claims and their equivalents.

What is claimed is:

1. A method of converting an input data to an output data, performed in a data processing device including a processor and a memory, method comprising:

acquiring, by the processor, the input data in a specific format including a character string of plaintext, wherein a length of the output data and characters constituting the output data are predefined;

encrypting, by the processor, the input data by executing a one-way function;

dividing, by the processor, the encrypted input data into a plurality of blocks, wherein the number of blocks in the plurality of blocks is equivalent to the length of the output data;

calculating, by the processor, an index corresponding to each block of the plurality of blocks;

generating, by the processor, an output character corresponding to each block by selecting a character, corresponding to the index, from among a character set according to characteristics of the specific format, and generating, by the processor, the output data by combining generated output characters such that the output data is in the specific format of the input data and the specific format is preserved, wherein a size of each of the plurality of blocks is determined based on the number of character-elements included in the character set.

2. The method according to claim 1, wherein the one-way function is executed iteratively in order that a length of the encrypted input data is equal or longer than the length of the output data.

3. The method according to claim 1, wherein the one-way function is executed using all or part of the input data and an arbitrary seed as inputs.

4. A method of verifying an alternative data, performed in a data processing device including a processor and a memory, the method comprising:

acquiring, by the processor, an input data in a specific format including an input character string of plaintext, wherein a length of the alternative data and characters constituting the alternative data are predefined;

acquiring, by the processor, the alternative data corresponding to the input data;

encrypting, by the processor, the input data by executing a one-way function;

dividing, by the processor, encrypted input data into a plurality of blocks, wherein the number of blocks in the plurality of blocks is equivalent to the length of the alternative data;

calculating, by the processor, an index corresponding to each block of the plurality of blocks;

generating, by the processor, an output character corresponding to each block by selecting a character, corresponding to the index, from among a character set according to characteristics of the specific format;

generating, by the processor, the output data by combining generated output characters such that the output data is in the specific format of the input data and the specific format is preserved; and determining, by the processor, whether the output data is the same as the alternative information, wherein a size of each of the plurality of blocks is determined based on the number of character-elements included in the character set.

5. A method of converting an input data to an output data using a random number, performed in a data processing device including a processor and a memory, the method comprising:

generating, by the processor, random numbers of the input data in a specific using a random number generator, wherein a length of the output data and characters constituting the output data are predefined;

generating, by the processor, a cipher data (CD) by combining the random numbers;

dividing, by the processor, the CD into a plurality of blocks, wherein the number of blocks in the plurality of blocks is equivalent to the length of the output data;

calculating, by the processor, an index corresponding to each block of the plurality of blocks;

generating, by the processor, an output character corresponding to each block by selecting a character, corresponding to the index, from among a character set according to characteristics of the specific format; and generating, by the processor, the output data by combining generated output characters such that the output data is in the specific format of the input data and the specific format is preserved, and wherein a size of each of the plurality of blocks is determined based on a number of character-elements included in the character set.

6. The method according to claim 5, wherein the random numbers are iteratively generated in order that a length of the CD is equal or longer than the length of the output data.

7. A data processing device for converting an input data to an output data comprising:

a processor; and a memory storing a program by performed the processor, wherein the program to be executed comprises:

acquiring the input data in a specific format including an input character string of plaintext, wherein a length of the output data and characters constituting the output data are predefined;

encrypting the input data by executing a one-way function;

dividing encrypted input data into a plurality of blocks, wherein the number of blocks in the plurality of blocks is equivalent to the length of the output data;

calculating, by the processor, an index corresponding to each block of the plurality of blocks;

generating, by the processor, an output character corresponding to each block by selecting a character, corresponding to the index, from among a character set according to characteristics of the specific format, and generating, by the processor, the output data by combining generated output characters such that the output data is in the specific format of the input data and the specific format is preserved, wherein a size of each of the plurality of blocks is determined based on the number of character-elements included in the character set.

* * * * *